G. O. BURWELL & C. M. KURTZ.
TROLLEY.
APPLICATION FILED APR. 26, 1912.

1,081,809.

Patented Dec. 16, 1913.

Witnesses
E. Larson
Ma. Schmidt

Inventors
G. O. Burwell,
and
C. M. Kurtz.
By Milo B. Stevens & Co.
Attorneys

UNITED STATES PATENT OFFICE.

GEORGE O. BURWELL AND CHARLES M. KURTZ, OF BELLEVUE, PENNSYLVANIA.

TROLLEY.

1,081,809.  Specification of Letters Patent.  Patented Dec. 16, 1913.

Application filed April 26, 1912. Serial No. 693,484.

*To all whom it may concern:*

Be it known that we, GEORGE O. BURWELL and CHARLES M. KURTZ, citizens of the United States, residing at Bellevue, in the county of Allegheny and State of Pennsylvania, have invented certain new and useful Improvements in Trolleys, of which the following is a specification.

This invention relates to overhead trolleys for electric railways, and its object is to provide a novel and improved support for the trolley-wheel, whereby the latter is left free to automatically adapt itself to curves and will not slip off the wire when rounding curves or taking switches, or on straight lines.

The invention also has for its object to provide a support which acts as a guard and prevents injury to cross-wires in case the wheel should jump the wire.

Figure 1:
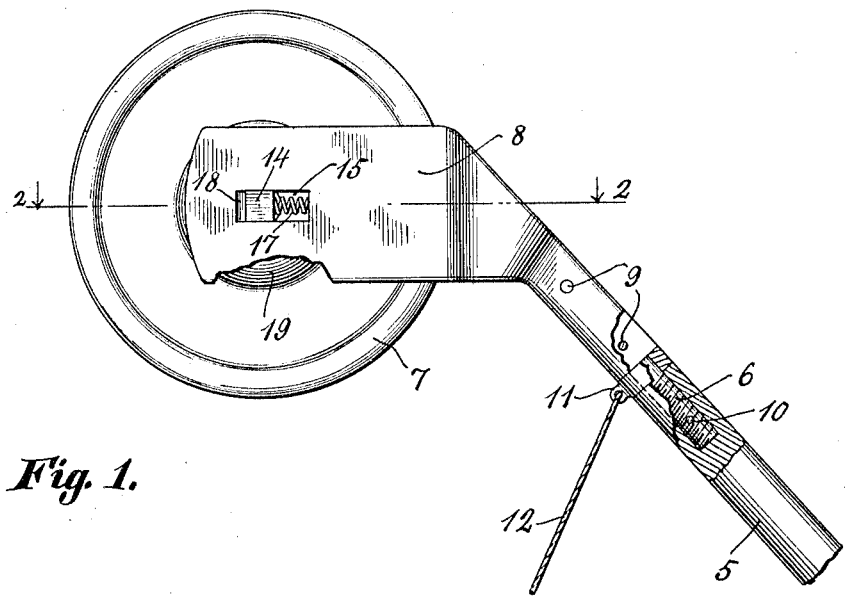
Figure 2:
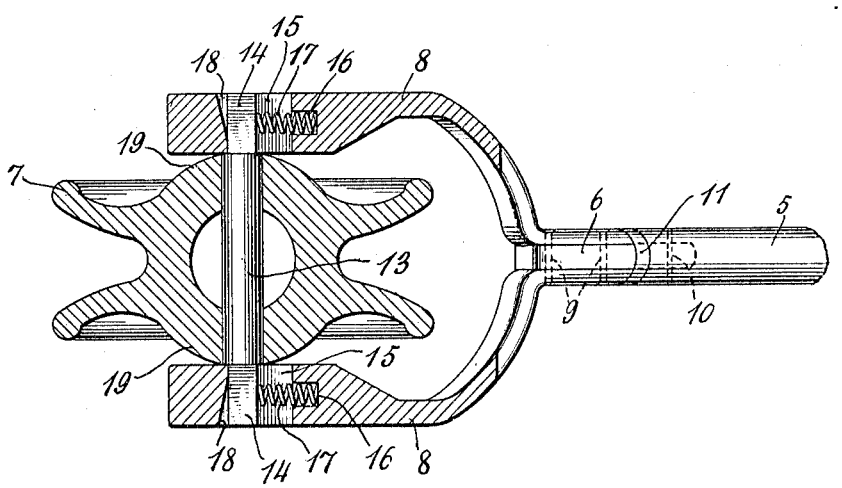

In the accompanying drawing, Figure 1 is a side elevation of the invention, partly broken away. Fig. 2 is a horizontal section on the line 2—2 of Fig. 1.

Referring specifically to the drawing, 5 denotes a fragment of a trolley-pole which is mounted on the car in the ordinary manner. In the outer end of the pole is a threaded axial socket into which is screwed the shank 6 of a fork which supports the trolley-wheel 7. The branches 8 of the fork are separate from the shank, and are riveted or otherwise secured thereto as indicated at 9. A pin 10 passing through that portion of the shank which seats in the socket, prevents rotation of said shank relative to the pole 5. A swiveled ring 11 carried by the pole serves as a means for connecting the usual line 12 whereby the pole is lowered.

Referring to Fig. 1, it will be seen that the extremities of the fork branches 8, between which the wheel 7 is located, extend at an angle to the pole 5 and are horizontal when the wheel is on the wire, the top edges of said branches, at their inner ends, extending slightly beyond the corresponding edge of the wheel, from which point said edges are inclined downward and extend in alinement with the pole. The top edges of the fork branches lie entirely above the horizontal center line of the wheel and the incline is outside the edge of the wheel and starts above the horizontal center line thereof. By this construction the fork branches act as a guard and if the wheel should jump the wire, the cross-wires cannot strike the wheel below the horizontal center thereof and cause it to become fastened to said cross-wires and tear the same down, as is the case with the ordinary trolley forks. With the present construction the wheel will revolve and pass under the cross-wire. There are also no projections of any kind which will do harm or injury to the overhead wires or constructions if the wheel should jump the wire.

The wheel 7 is loosely mounted on an axle 13 carried by the fork branches and extending therebetween transversely. The ends of the axle are squared, as indicated at 14, and said squared ends seat in rectangular slots 15 in the fork branches, said slots being elongated longitudinally or in the direction of the travel of the wheel. The ends of the axle are slidable in the slots which allows the wheel a swing about a vertical axis passing through the plane of the wheel, whereby the wheel is caused to automatically adjust itself to the wire on a curve and follow the wire. In one of the end walls of the slots is a recess 16 in which seats a coiled spring 17 which bears against the axle and normally holds the same against the opposite end wall of the slot. The last-mentioned end wall is beveled as indicated at 18 to allow a more free play of the axle. The opposite faces of the wheel are formed with central semispherical bosses 19 which are opposite the inner surface of the fork branches and take bearing thereagainst when the wheel oscillates or swings as described. The springs 17 yield either way when the axle shifts in the slots by the pressure of the curved wire on the wheel, and when the wheel again reaches the straight portion of the wire, the springs restore the axle to its normal position.

The fork branches are in two parts so that the wheel and axle may be assembled therebetween, said parts being secured to the shank 6 as already described.

In case the wheel should get disabled another one can be quickly put up by the train crew without causing great delay.

We claim:

The combination of a support having branches provided with slots, said slots having their rear ends beveled, said bevels extending rearwardly from the inner sides of the branches to the outer sides thereof, an axle slidably mounted in the slots, a wheel mounted upon the axle, and springs located in the slots of the branches and bearing at their rear ends against the end portions of the axle beyond the inner edges of the beveled ends of the slots and the inner edges of the beveled ends of the slots lying between the springs.

In testimony whereof we affix our signatures in presence of two witnesses.

GEORGE O. BURWELL.
CHARLES M. KURTZ.

Witnesses:
ELLA M. KURTZ,
MARTHELLA H. COWELL.

Copies of this patent may be obtained for five cents each, by addressing the "Commissioner of Patents, Washington, D. C."